United States Patent
Anupam et al.

(10) Patent No.: US 6,353,851 B1
(45) Date of Patent: Mar. 5, 2002

(54) METHOD AND APPARATUS FOR SHARING ASYMMETRIC INFORMATION AND SERVICES IN SIMULTANEOUSLY VIEWED DOCUMENTS ON A COMMUNICATION SYSTEM

(75) Inventors: Vinod Anupam, Scotch; Narain H. Gehani, Summit, both of NJ (US); Viswanath Kadambari, Herndon, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/221,067

(22) Filed: Dec. 28, 1998

(51) Int. Cl.⁷ .............................................. G06F 13/00
(52) U.S. Cl. ........................ 709/204; 709/205; 709/202
(58) Field of Search ................................. 709/204, 205, 709/202

(56) References Cited

U.S. PATENT DOCUMENTS

| | | | | |
|---|---|---|---|---|
| 5,862,330 A | * | 1/1999 | Anupam et al. | 709/204 |
| 5,944,791 A | * | 8/1999 | Scherpbier | 709/218 |
| 5,991,796 A | * | 11/1999 | Anupam et al. | 709/206 |
| 6,070,185 A | * | 5/2000 | Anupam et al. | 709/204 |
| 6,151,020 A | * | 11/2000 | Palmer et al. | 345/329 |
| 6,151,622 A | * | 11/2000 | Fraenkel et al. | 709/205 |
| 6,175,842 B1 | * | 1/2001 | Kirk et al. | 707/513 |
| 6,181,689 B1 | * | 1/2001 | Choung et al. | 370/352 |
| 6,230,171 B1 | * | 5/2001 | Pacifici et al. | 707/512 |
| 6,240,443 B1 | * | 5/2001 | Suzuki et al. | 709/204 |
| 6,295,551 B1 | * | 9/2001 | Roberts et al. | 709/205 |

FOREIGN PATENT DOCUMENTS

EP          0 989501      *    3/2000

OTHER PUBLICATIONS

Souya et al. Joint Class Experiments Based on Realtime Web–browser Synchronization. IEEE Online. Jul. 15–17, 1998. pp 367–372.*

Min et al. A Distributed Multimedia Conferencing System for Distance Learning. IEEE Online. Apr. 20–21, 1998. pp. 88–95.*

Lee et al. Design and Implementation of Important Applications in a Java–based Multimedia Digital Classroom. Jun. 11–13, 1997. pp 264–270.*

* cited by examiner

Primary Examiner—Kenneth R. Coulter

(57) ABSTRACT

An arrangement for realizing asymmetric collaboration utilizes a "shared Web-top", i.e., a work space, in which different in-document applications can run and be shared. Specifically, in one embodiment of the invention employed in asymmetric collaboration, documents to be collaborated on at different users' terminals are logically identical but structurally different. Indeed, one of the collaborators, for example, a customer service agent, may have access to information that should not be made available to others of the collaborators. This asymmetric collaboration is realized by assigning a unique logical name to each information entity. Then, changes in the entity captured by some detection technique, for example, the use of document polling or event handlers, are propagated along with the name of the entity to the collaborators, where they are processed only if the relevant named entity exists. If the entity exists the logical name of the entity is mapped into its physical name which, therefore, allows asymmetric collaboration. Consequently, the name-based technique allows the collaborators, e.g., customer and agent, to share changes in the logically common portions of documents, which are structurally different.

94 Claims, 9 Drawing Sheets

METHOD AND APPARATUS FOR SHARING ASYMMETRIC INFORMATION AND SERVICES IN SIMULTANEOUSLY VIEWED DOCUMENTS ON A COMMUNICATION SYSTEM

RELATED APPLICATIONS

U.S. patent application Ser. No. 09/221,069 and Ser. No. 09/221,068 were filed concurrently herewith.

TECHNICAL FIELD

The invention relates to communications systems and methods, and in particular to systems and methods for allowing users to obtain information and services on the World Wide Web (WWW) or the "web".

BACKGROUND OF THE INVENTION

Computer users can access many information resources on an expansive international network of computer networks known as the Internet. The WWW is a graphical subnetwork of the Internet. With common "web browser" software such as the NETSCAPE NAVIGATOR and INTERNET EXPLORER browsers, the users can readily access Internet information and services provided by web servers on the WWW.

Computer users can also share a web browsing experience using a collaborative browsing scheme. In one such scheme, users are provided capabilities for collaborative or shared browsing of hypertext markup language (HTML) documents at various uniform resource locators (URLs or website addresses) on the WWW.

Another arrangement utilizes a polling technique in a surrogate for sharing values in a multi-user application, which employs simultaneously viewed documents on the WEB. This arrangement although advantageous in certain applications, requires the surrogate to periodically poll the viewed document to determine if any changes have occurred. Such polling is potentially expensive from the prospective of computation time and, therefore, inefficient. Furthermore, the prior polling arrangement can only be employed when the documents at all user locations are structurally and logically identical, i.e., the collaboration must be symmetrical.

Still another arrangement utilizes so-called event handlers that are inserted into the documents and inform a surrogate that associated form element values have changed. Again, although this prior event handler arrangement functions satisfactorily in many applications, it is also limited to symmetrical collaboration.

More recently, a system has been proposed in which a customer and customer service agent may access to different information when the customer service agent is servicing the customer, i.e., asymmetric browsing. However, this prior system is concerned with the browsing of different versions of information related to the customer. In particular the customer service agent may have access to proprietary information that should not necessarily be made available to the customer.

SUMMARY OF THE INVENTION

Problems and limitations of prior known collaborative arrangements are addressed in an asymmetric collaboration arrangement that creates a "shared Web-top", i.e., a work space, in which different in-document applications, for example, within a document page, can run and be shared.

Specifically, in one embodiment of the invention employed in asymmetric collaboration, documents to be collaborated on at different users' terminals are logically identical but structurally different. Indeed, one of the collaborators, for example, a customer service agent, may have access to information that should not be made available to others of the collaborators. This asymmetric collaboration is realized by assigning a unique logical name to each information entity. Then, changes in the entity captured by some detection technique, for example, the use of document polling or event handlers, are propagated along with the name of the entity to the collaborators, where they are processed only if the relevant named entity exists. If the entity exists the logical name of the entity is mapped into its physical name which, therefore, allows asymmetric collaboration. Consequently, the name-based technique allows the collaborators, e.g., customer and agent, to share changes in the logically common portions of documents, which are structurally different.

DETAILED DESCRIPTION

Figure 1:
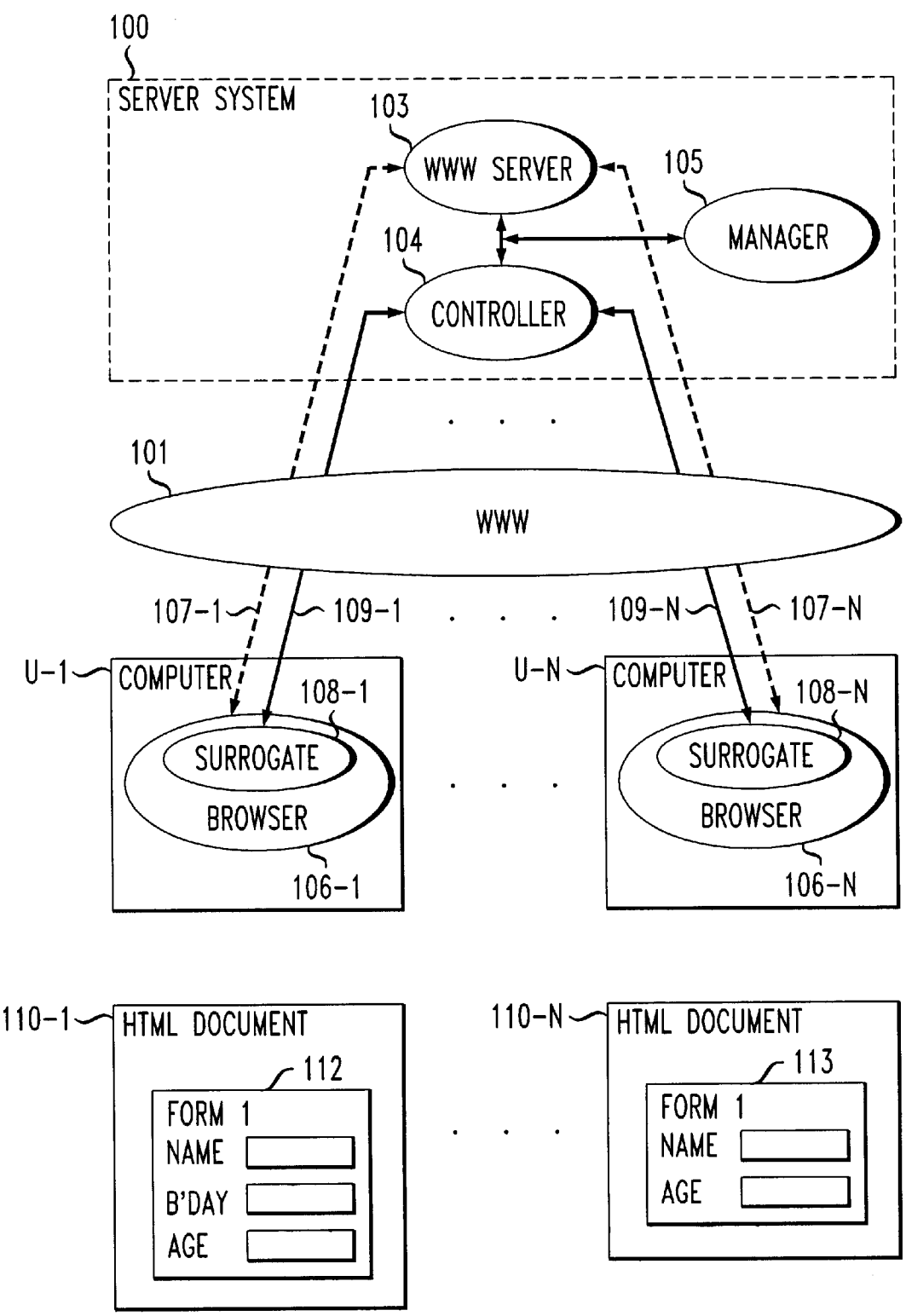
FIG. 1 is a simplified block diagram of a server system including an embodiment of the invention for obtaining and exchanging information over the WWW.

FIG. 1 shows, in simplified block diagram form, server system 100 embodying the principles of the invention, which is connected to the World Wide Web (WWW) 101 as a web server. Server system 100 includes WWW server 102, controller 103 and manager 104. Advantageously, server system 100 operates compatibly with standard web browsers such as the NETSCAPE browser, the standard hypertext transfer protocol (HTTP) and hypertext markup language (HTML). Among other things, server system 100 provides users with services of (a) collaborative browsing of HTML documents at various web sites on WWW 101, and (b) real-time, interactive collaborative communications between the users. Specifically, with server system 100, during a collaborative browsing session, multiple users or collaborators are allowed to synchronously and collaboratively input data into a document or otherwise edit the document. The collaborators may also interact with one another through text-chat communications, for example. In addition, server system 100 allows users to join and exit an on-going session and is capable of scaling its capacity to accommodate a changing number of sessions and collaborators in a particular session.

As shown in FIG. 1, a user may utilize computer U-1 to access server system 100 over WWW 101 at a predetermined Uniform Resource Locator (URL). In this example, it is assumed that the user of U-1 is a customer service agent (CSA) who may be located at a customer service center, for example, a call center. Computer U-1 may be a conventional personal computer (PC) running standard web browser 106-1, such as the NETSCAPE browser. As soon as U-1 is connected to server system 100 through link 107-1, manager 104 in server system 100 starts communicating with U-1 through web browser 106-1 and WWW server 102 having a common gate interface (CGI).

Figure 2A:
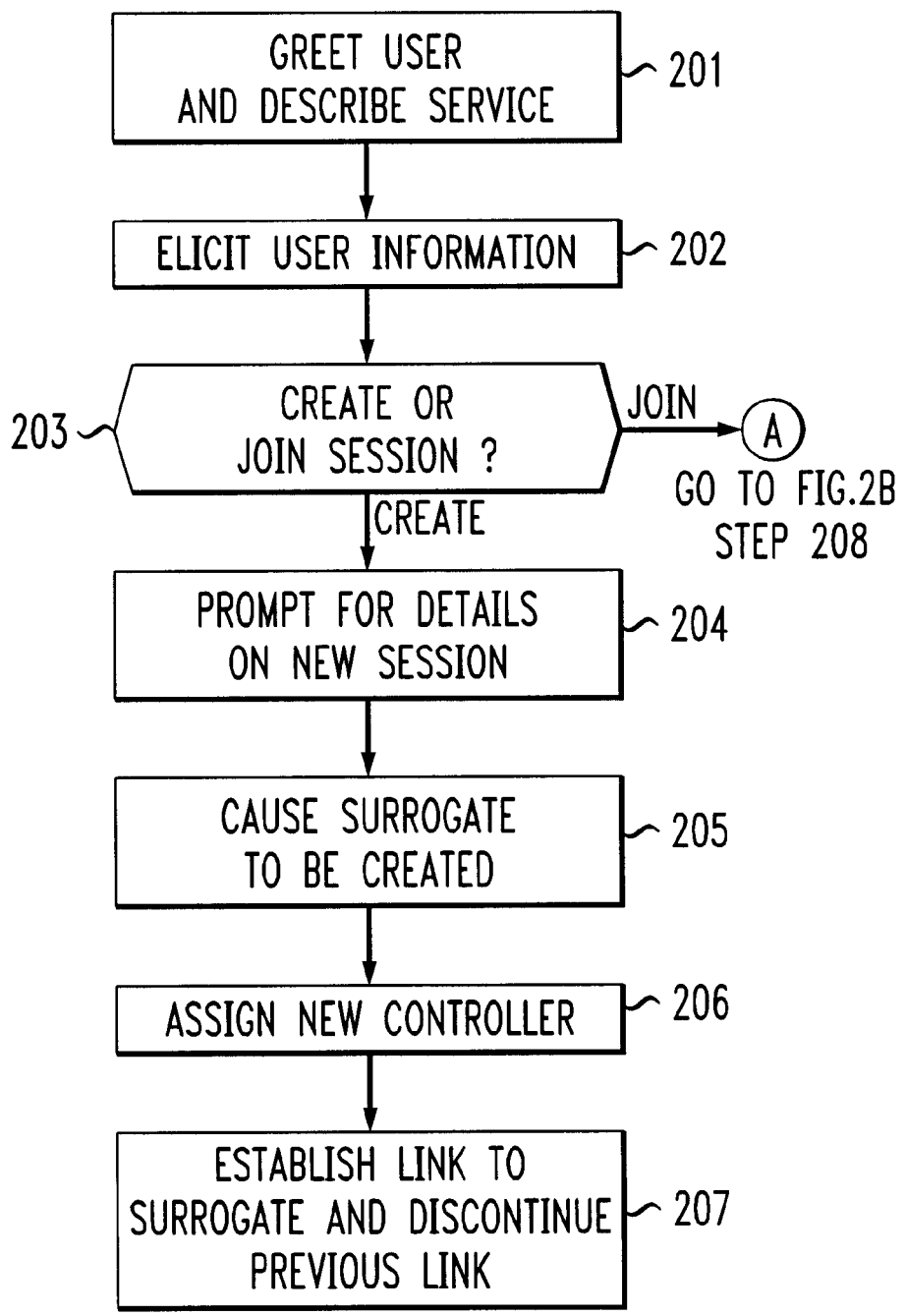
FIGS. 2A and 2B form a flowchart depicting the steps in carrying out the operation of the system of FIG. 1.
Figure 2B:
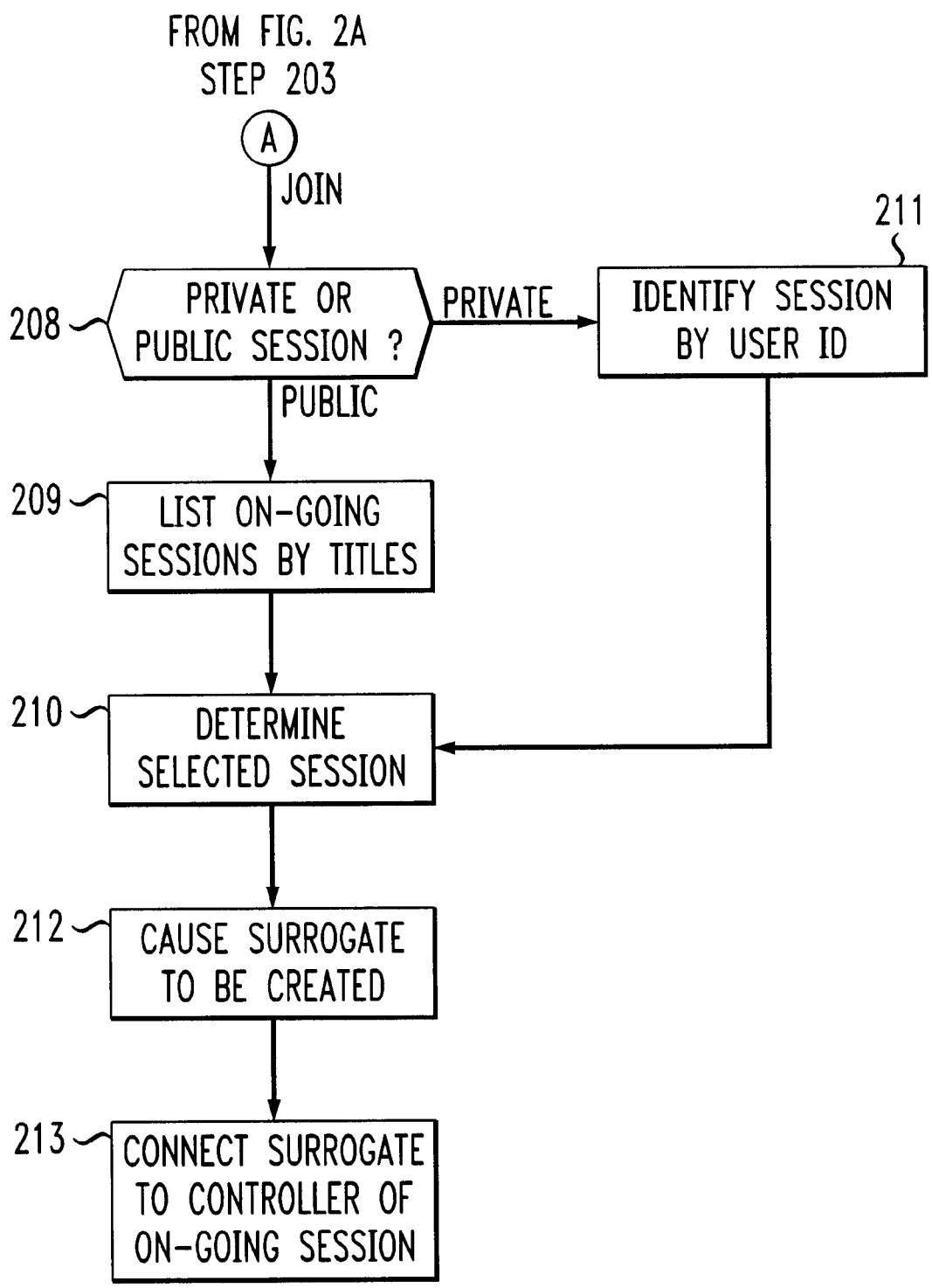

Manager 104 includes a service routine shown in FIG. 2A and FIG. 2B for helping a user to establish an interactive collaborative browsing session. FIGS. 2A and 2B illustrates the steps of a service routine including an embodiment of the invention. At step 201, manager 104 causes a "home page" to be displayed on U-1, which greets the user, and describes the service provided by server system 100. Manager 104 then elicits from U-1 user information, as indicated at step 202. This information includes a user identification (ID), password and other administrative data necessary for ensuring that the user is an authorized user. At step 203, manager 104 queries U-1 as to whether the user wants to create a session, or join an on-going session. In this instance, the user of U-1 chooses to create a session. Manager 104, at step 204, then prompts the user for the details on the session to be created, such as the purpose of or the document to be addressed during the session, and whether it is a private or public session. By way of example, if it is a private session, a would-be collaborator must identify the user by his/her user ID who created the session in order to join it. It is assumed that all sessions would be private that deal with filling-in personal or otherwise sensitive user information into documents, i.e., forms or the like. If it is a public session, the topic of or the document to be edited or filled in during the session is listed and is searchable by a prospective collaborator. In this embodiment of the invention, whether private or public, the session is interactive among the collaborators in order to collaboratively input data into the document, for example, into one or more forms in the document.

In this instance, the user of U-1 replies that the session to be created is a private session. Indeed, the user of U-1 may be, for example, a customer service agent for a medical insurance company located at a company call center or other service location. Manager 104 proceeds to start the new session and causes surrogate 108-1 to be created within browser 106-1 in computer U-1, as indicated at step 205. To that end, server system 100 transmits to computer U-1 mobile code pursuant to a mobile programming language such as the standard JAVA language. Thus, in this instance, the mobile code may be in the form of a JAVA applet. (For a discussion on JAVA and JAVA applets see, for example, "Teach Yourself JAVA in 21 Days, Professional Reference Edition" *Sam's Net*, Indianapolis, Ind., 1996 and/or "Learn JAVA Now", *Microsoft Press*, 1996. ) Surrogate 108-1 is realized when the JAVA applet starts to run within browser 106-1 as soon as it reaches computer U-1. Surrogate 108-1 is further described below in relationship to FIG. 3, and it suffices to know for now that it serves as an assistant to browser 106-1 to carry out the session.

Since in this instance it is a new session, manager 104 at step 206 assigns a new controller, numerically denoted 103, to control and regulate the session. Manager 104, at step 207, causes controller 103 to be connected to surrogate 108-1 through link 102-1, and at the same time discontinues link 107-1. Surrogate 108-1 serves as an interface between, browser 106-1 and controller 103. Among other things, surrogate 108-1 monitors user interaction with browser 106-1, and reports the user interaction to controller 103. It should be noted at this point that surrogate 108-1 is realized using a JAVA applet, which is transmitted to and executed on U-1 on an on-demand basis. Indeed, no software needs to be installed or maintained on the user computer beforehand, as is required in traditional applications. Thus, any standard JAVA-enabled browser such as the NETSCAPE browser can be utilized to implement the invention. In other words, server system 100 does not require the users to have specialized browser software to take advantage of the inventive service.

After the new session starts, the user of computer U-1 may change the URL with browser 106-1 to a web site to obtain information concerning the medical insurance form to be completed. The new URL is transmitted by surrogate 108-1 to controller 103, where the new URL is recorded and conveyed to the surrogates of other collaborators, if any, in the same session. At the same time, browser 106-1 accesses a web server at the new URL, and opens on computer U-1 a HTLM document provided by the web server, in this example, an medical insurance form.

A second user, for example, an insured person, may utilize computer U-N to access server system 100 at the predetermined URL to join an on-going session or to request assistance in making an insurance claim. After computer U-N establishes link 107-N to WWW server 102, manager 104 similarly performs steps 201 and 202 of FIG. 2A, previously described. However, at step 203, the user of U-N in this instance chooses to join an on-going session. As such, manager 107 queries U-N as to whether the second user wants to join a private session or public session, as indicated at step 208 in FIG. 2B. In this instance, the second user chooses to join a private session with the insurance company customer service agent. If the user of U-N wished to join a public session, manager 104 would proceed to steps 209 and 210. Since, the second user has chosen to join the private session with the insurance company customer service agent he/she needs to identify the private session to be joined, by the user ID of the creator of that session, as indicated at step 211.

In any event, at step 208, manager 104 causes a list of all the on-going sessions to be displayed on computer U-N including the medical insurance form session created by the user of computer U-1. Manager 104 then proceeds to step 210 where it determines the particular session selected by the second user. In this example, the second user chooses to join the private medical insurance form session by pointing and clicking using a mouse device at the listed topic. At step 212, surrogate 108-N is created on computer U-N, in a manner described before, within browser 106-N, which may be different from browser 106-1. Once surrogate 108-N is created, knowing that the medical insurance form session was assigned to controller 103, manager 104 causes controller 103 to be connected to surrogate 108-N through link 107-N, as indicated at step 213.

At that point, a message is sent by controller 103 to each collaborator's computer connected thereto about the presence of a new collaborator. The user of U-N is then afforded a chance to visit the sequence of URLs that the session has gone through to review its history. This sequence of URLs has been recorded and is updated in controller 103 as the session progresses. The user of, U-N is also afforded an option to browse new HTML documents synchronously with other collaborators and, in this example, with the service agent. When that option is exercised, controller 103 sends the current URL to surrogate 108-N. The latter then directs web browser 106-N to open the HTML document at the current URL. During the medical insurance form session, when browser 106-1 initiates a change in the URL, the new URL information is obtained by surrogate 108-1, and the latter communicates this information to the surrogates of all other collaborators via controller 103. Each surrogate then directs its respective browser to open the HTML document at the new URL. As such, the collaborators manage to synchronously move from one URL to another to browse documents as the session progresses.

In this particular embodiment, the creator of the session, i.e., the customer service agent, is afforded access to additional information that may be of a sensitive nature or proprietary or both, which is not available to other collaborators including the insured person. This is clearly indicated in HTML document displayed on a monitor as form 112 in document 110-1, which includes an additional field than the form 113 in document 110-N. Moreover, the customer service agent, in this example, has the control of leading the session. In addition, the surrogates connected to controller 103 are programmed to allow the collaborators to communicate interactively in text with one another in real time.

Figure 3:
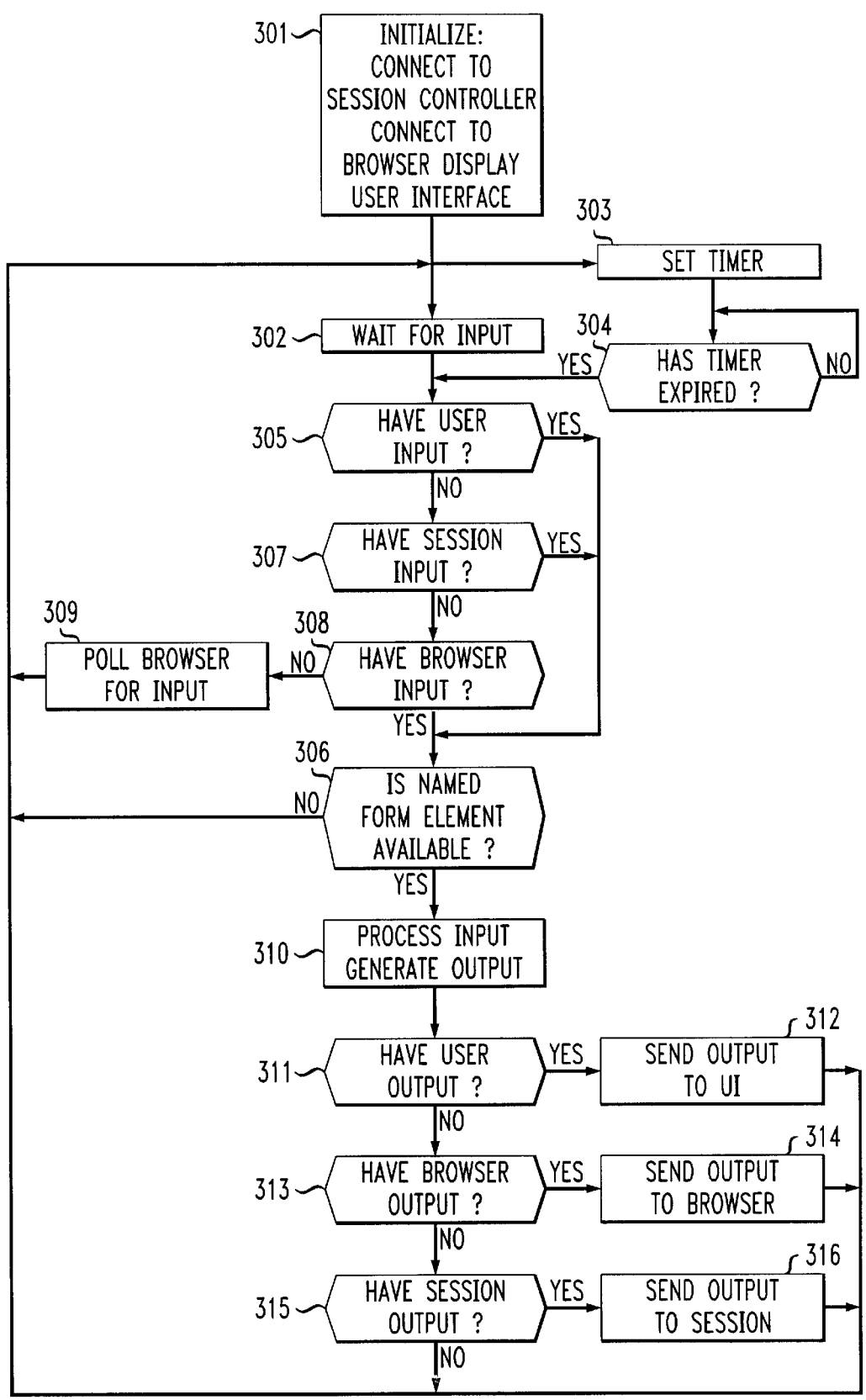
FIG. 3 is a flowchart illustrating the steps taken in a surrogate employed in the process of FIGS. 2A and 2B that may be utilized in an embodiment of the invention.

FIG. 3 is a flowchart illustrating the steps taken in a surrogate 108 employed in the process of FIGS. 2A and 2B and including an embodiment of the invention. Specifically, surrogate 108 in step 301 initializes by connecting to session controller 103 and to browser 106 and displaying the user interface. Then, control is transferred to steps 302 and 303. In step 302, surrogate 108 waits for an input and in step 303 a timer is set to a predetermined interval. Step 304 tests to determine if the timer has timed out, i.e., whether the predetermined interval has expired, i.e., terminated. Steps 303 and 304 are employed to insure that a polling cycle will be initiated after a predetermined interval of not receiving an input.

Thus, the surrogate, in this example, periodically checks the document structure for changes in the values of prescribed properties, e.g., document elements or form elements, of the document and transmits changes along with the name of the document element or form element it applies to the other collaborators in a session via a communication channel. It is noted that the documents do not have to be "collaboration aware", i.e., documents that were not created with an awareness of the potential that they may be filled in by multiple cooperating users. The only requirement is that the surrogate be able to read and write properties of the document. To this end, the surrogate monitors the activity as collaborators, i.e., users, enter data into the documents and, specifically, in forms included in the documents, and the entered data, i.e., the change in the property along with the name of the form element it applies to, is relayed to the other users' surrogates so that the correct field including the named element if present in the forms are collaboratively filled in.. This is realized in this embodiment of the invention by assigning a distinct name to each element in a form (document element). In the simple example, shown in FIG. 1, form 112 includes three elements, namely, "Name", "Birthday" (B'day), and "Age" and form 113 includes only two of the elements, namely, "Name" and "Age". Thus, in this example, a Web-page author would assign logical names to the form elements and use for form 112 the following HTML:

<FORM>
<INPUT TYPE=TEXT NAME=myName>
<INPUT TYPE=TEXT NAME=myBirthDate>
<INPUT TYPE=TEXT NAME=myAge>
<FORM> and use for form 113 the following HTML:

<FORM>
<INPUT TYPE=TEXT NAME=myName>
<INPUT TYPE=TEXT NAME=myAge>
<FORM>.

Figure 4:
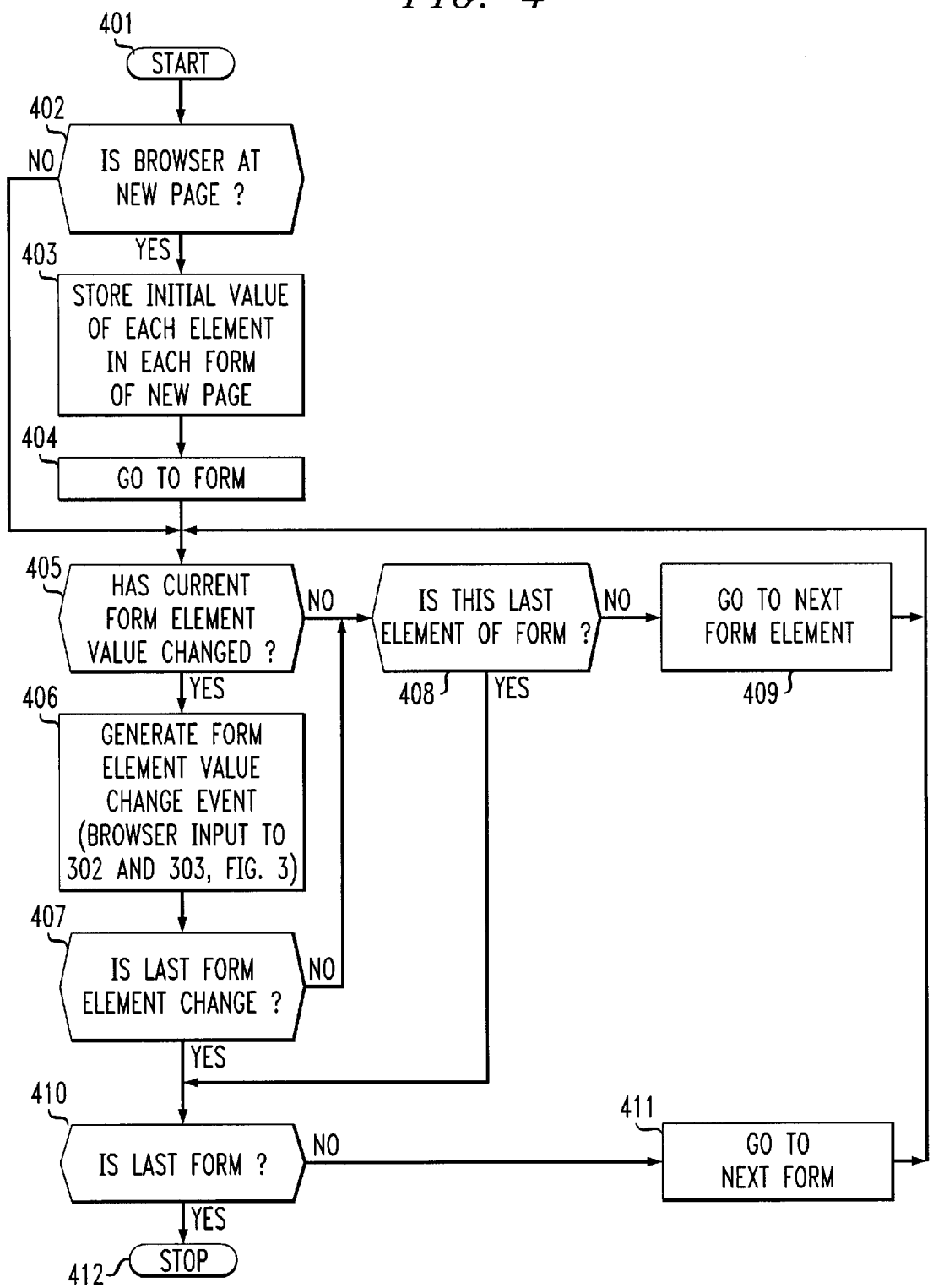
FIG. 4 is a flowchart depicting the steps of applicants' unique polling loop employed in the surrogate of FIG. 3.

Returning to FIG. 3, control is then transferred from step 304 to step 305. Returning to step 302, upon an input control is transferred to step 305, which tests to determine if there is a user input. If the test result in step 305 is YES, control is transferred to step 306, where it is determined whether the named form element is available. If the test result in step 305 is NO, control is transferred to step 307, which tests to determine if there is a session input. If the test result in step 307 is YES, control is transferred to step 306, where again it is determined whether the named form element is available. If the test result in step 307 is NO, control is transferred to step 308, which tests to determine if there is a browser input. If the test result in step 308 is YES, control is transferred to step 306, where it is determined whether the named form element is available. If the test result in step 308 is NO, control is transferred to step 309 and a browser polling cycle is initiated. A browser polling cycle is shown in FIG. 4 and described below. Upon completion of the polling cycle, control is returned to step 302 which is waiting for an input and to step 303 which sets a timer, and steps 302 through 305 and steps 307 through 309 are iterated until either step 305, step 307 or step 308 yields a YES result. Then, control is transferred to step 306, which again tests to determined whether the named form element is available. If the test result in step 306 is NO, control is transferred to steps 302 and 303 and steps 302 through 309 are iterated until step 306 yields a YES result and control is transferred to step 310. Step 306 yielding a YES result indicates that the named element is present in the user's form and the logical name is mapped into the physical name of the form element. This allows for the desired asymmetric collaboration. Step 310 processes the input and generates an output in accordance with prescribed criteria. Specifically, if the input is a user input as indicated in step 305, step 310 processes it to generate a session or browser output. If the input is a session input as indicated in step 307, step 310 processes it to generate a user or browser output. If the input is a browser input as indicated in step 308, step 310 processes it to generate a session output. Upon processing an input and generating an output in step 310, control is transferred to step 311, which tests to determine if there is a user output. If the test result in step 311 is YES, control is transferred to step 312, which sends the user output to a user interface (UI), control is returned to steps 302 and 303, and the process is iterated as described above, i.e., steps 302 through 316 are repeated. If the test result in step 311 is NO, control is transferred to step 313, which tests to determine if there is a browser output. If the test result in step 313 is YES, control is transferred to step 314, which sends the browser output to the browser, control is returned to steps 302 and 303, and the process is iterated as described above, i.e., steps 302 through 316 are repeated. If the test result in step 313 is NO, control is transferred to step 315, which tests to determine if there is a session output. If the test result in step 315 is YES, control is transferred to step 316, which sends the session output to the session, control is returned to steps 302 and 303, and the process is iterated as described above, i.e., steps 302 through 316 are repeated. If the test result in step 315 is NO, control is transferred to steps 302 and 303 and the process is iterated as described above, i.e., steps 302 through 316 are repeated.

In this example, the surrogate continuously keeps track of the state of the forms in a document by examining the form(s) structure. That is, the surrogate polls the structure of the form(s) in the document. For example, in a browser scripting language like JavaScript, "document.forms[0]" refers to the first form in the document, "document.forms[1].elements[0]" refers to the first element of the second form in the document and so on. To this end, the surrogate executes the following polling process for each shared window in the session:

```
if browser is at a new page
    for each form in the document
        for each element in the form
            remember the initial value of the form element
        loop
    loop
end-if
while the browser is at this page
    for each form in the document
        for each element in the form
            if current value of the form element differs from the
                saved value
                remember current value
                notify other users of new value
            end-if
        loop
    loop
loop
```

When the other collaborators' surrogates receive notification of a change along with the logical name of the element, the users' surrogates test to determine whether the named form element is available and, if so, update the corresponding data entry in their form.

FIG. 4 is a flowchart depicting the steps of applicants' unique polling loop including an embodiment of the invention that is employed in the surrogate of FIG. 3. Thus, the polling process is started via step 401. Thereafter, control is transferred to step 402, which tests to determine if the browser is at a new page. If the test result in step 402 is YES, control is transferred to step 403, which causes the storage of the initial values of each element in each form of the document page. The, step 404 goes to the first form on the new page. Thereafter, control is transferred to step 405, which tests to determine if the current form element has changed. Returning to step 402, if the test result is NO, the browser is not at a new page and control is transferred to step 405. If the test result in step 405 is YES, step 406 causes a form element value change event, i.e., a browser input, to be generated and supplied as an input to step 302 and 303 of the surrogate in FIG. 3. Then, control is transferred to step 407, which tests to determine if this is the last form element change. If the test result in step 407 is NO, control is transferred to step 408. Returning to step 405, if the test result is NO, control is transferred to step 408, which tests to determine if this is the last element of the current form. If the test result in step 408 is NO, it is not the last element in the form and step 409 causes the process to go, i.e., route, to the next form element and control is then returned to step 406. If the test result in step 408 is YES, the current form element is the last element of the current form and control is transferred to step 410. Returning to step 407, if the test result is YES the current form element change is the last one and control is transferred to step 410. Step 410 tests to determine if the current form is the last form in the document. If the test result in step 410 is NO, the current form is not the last form in the document and step 411 causes the process to go, i.e., route, to the next form in the document and control is returned to step 405. Thereafter, steps 405 through 411 are iterated until step 410 yields a YES result indicating that all the forms in the document have been completed. Then, the unique polling process is stopped via step 412 and control is returned to the surrogate of FIG. 3.

Figure 5:
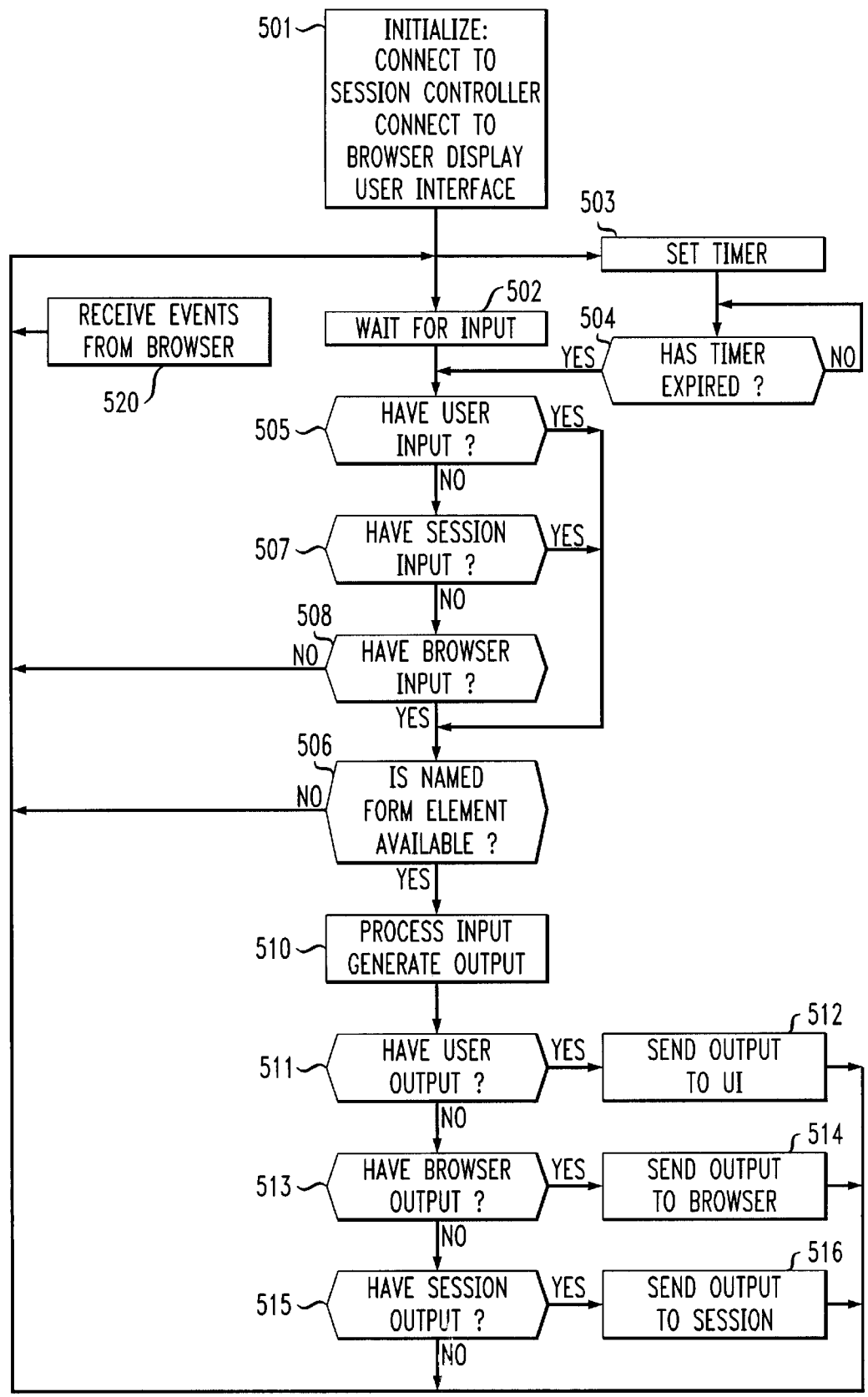
FIG. 5 is a flowchart illustrating the steps taken in another surrogate which may be employed in the process of FIGS. 2A and 2B that may be utilized in an embodiment of the invention.

FIG. 5 is a flowchart illustrating the steps taken in a surrogate 108 employed in the process of FIGS. 2A and 2B that employs so-called event handlers and may be utilized in an embodiment of the invention. Specifically, surrogate 108 in step 501 initializes by connecting to session controller 103 and to browser 106 and displaying the user interface. Then, control is transferred to steps 502 and 503. In step 502, surrogate 108 waits for an input and in step 503 a timer is set to a predetermined interval. Step 504 tests to determine if the timer has timed out, i.e., whether the predetermined interval has expired. Steps 503 and 504 are employed to insure that an input check cycle will be initiated after a predetermined interval of not receiving an input.

Thus, the surrogate, in this example, periodically checks the document structure for changes in the values of prescribed properties of the document and transmits changes along with the name of the form element it applies to the other collaborators in a session via a communication channel. It is noted that the documents do not have to be "collaboration aware", i.e., documents that were not created with an awareness of the potential that they may be filled in by multiple cooperating users. The only requirement is that the surrogate be able to read and write properties of the document. To this end, the surrogate monitors the activity as collaborators, i.e., users, enter data into the documents and, specifically, in forms included in the documents, and the entered data, i.e., the change in the property along with the name of the form element it applies to, is relayed to the other users' surrogates so that the correct field including the named element if present in the forms are collaboratively filled in. This is realized in this embodiment of the invention by assigning a distinct name to each element in a form. In the simple example, shown in FIG. 1, form 112 includes three elements, namely, "Name", "Birthday" (B'day), and "Age" and form 113 includes only two of the elements, namely, "Name" and "Age". Thus, in this example, a Web-page author would assign logical names to the form elements and use for form 112 the following HTML:

<FORM>
<INPUT TYPE=TEXT NAME=myName>
<INPUT TYPE=TEXT NAME=myBirthDate>
<INPUT TYPE=TEXT NAME=myAge>
<FORM> and use for form 113 the following HTML:

<FORM>
<INPUT TYPE=TEXT NAME=myName>
<INPUT TYPE=TEXT NAME=myAge>
<FORM>.

Returning to FIG. 5, control is then transferred from step 504 to step 505. Returning to step 502, upon receiving an input, control is transferred to step 505, which tests to determine if there is a user input. If the test result in step 505 is YES, control is transferred to step 506, where it is determined whether the named form element is available. If the test result in step 505 is NO, control is transferred to step 507, which tests to determine if there is a session input. If the test result in step 507 is YES, control is transferred to step 506, where it is determined whether the named form element is available. If the test result in step 507 is NO, control is transferred to step 508, which tests to determine if there is a browser input. If the test result in step 508 is YES, control is transferred to step 506, where it is determined whether the named form element is available. If the test result in step 508 is NO, control is transferred to steps 502 and 503 and steps 502 through 508 and 520 are iterated until either step 505, step 507 or step 508 yields a YES result. Then, control is transferred to step 506, which tests to determine whether the named form element is available. If the test result in step 506 is NO, control is transferred to steps 502 and 503 and steps 502 through 508 and 520 are iterated until step 506 yields a YES result and control is transferred to step 510. Step 506 yielding a YES result indicates that the named element is present in the user's form and the logical name is mapped into the physical name of the form element. This allows for the desired asymmetric collaboration.

Note that in step 520 events, i.e., changes in values of prescribed properties of forms in a document, are received from the browser. In this manner, the surrogate is notified by the event handlers of the changes in the forms. These events are supplied to the surrogate as browser inputs. To realize this, however, the event handlers need to be inserted into the document and, hence, into the forms therein. Moreover, the event handlers can also be dynamically inserted into documents that are not collaborative aware. The only requirement being that there is a capability to insert the event handlers into the document. To this end, the event handlers may be inserted into the document by a WEB page author. The insertion of these event handlers can occur at the WWW server 102 (FIG. 1) providing the document, or be effected by the surrogate once the document has been retrieved.

In the HTML document used in this example and shown in FIG. 1 a WEB page author can use JavaScript to insert event handlers in form 112 as follows:

```
<FORM>
<INPUT    TYPE=TEXT    ONCHANGE=
   "nameChangeHandler( )">
<INPUT    TYPE=TEXT    ONCHANGE=
   "birthdayChangeHandler( )">
<INPUT    TYPE=TEXT    ONCHANGE=
   "ageChangeHandler( )">
<FORM>
``` and in form 113 as follows:

```
<FORM>
<INPUT    TYPE=TEXT    ONCHANGE=
   "nameChangeHandler( )">
<INPUT    TYPE=TEXT    ONCHANGE=
   "ageChangeHandler( )">
<FORM>
``` to specify that the JavaScript function "nameChangeHandler( )" be invoked everytime the value of the "name" field of the form changes, that "birthdayChangeHandler( )" be invoked everytime the value of the "birthday" field of the form changes, and that "ageChangeHandler( )" be invoked every time the "age" field of the form changes because of a user input. Again, these event handlers communicate with the surrogate to transmit the changed value to other collaborators' surrogates where the field, i.e., form element, in the corresponding form is appropriately changed. This process, however, requires that the WEB-page author be aware of the possibility that the WEB-page will be viewed by multiple users simultaneously, and that the users will fill in the form collarboratively and interactively.

Alternatively, JavaScipt code in the surrogate is used to dynamically insert event handlers as follows:

```
document.forms[0].elements [0].onChange=
   changeHandler;
``` to specify that the JavaScript function "nameChangeHandler( )" be invoked everytime the value of the "name" field of the form changes. Again, these event handlers communicate with the surrogate to transmit the changed value to other collaborators' surrogates where the field in the corresponding is appropriately changed. This process, however, does not require that the WEB-page author be aware of the possibility that the WEB-page will be viewed by multiple users simultaneously, and that the users will fill in the form collarboratively and interactively. It does require, however, that the surrogate have the capability to insert event handlers into the document.

The above-noted JavaScript code statements are examples of code that can be employed to insert event handlers into the document. It will be apparent to those skilled in the art that further fields may be employed along with appropriate code to specify the corresponding changeHandler functions.

Figure 6:
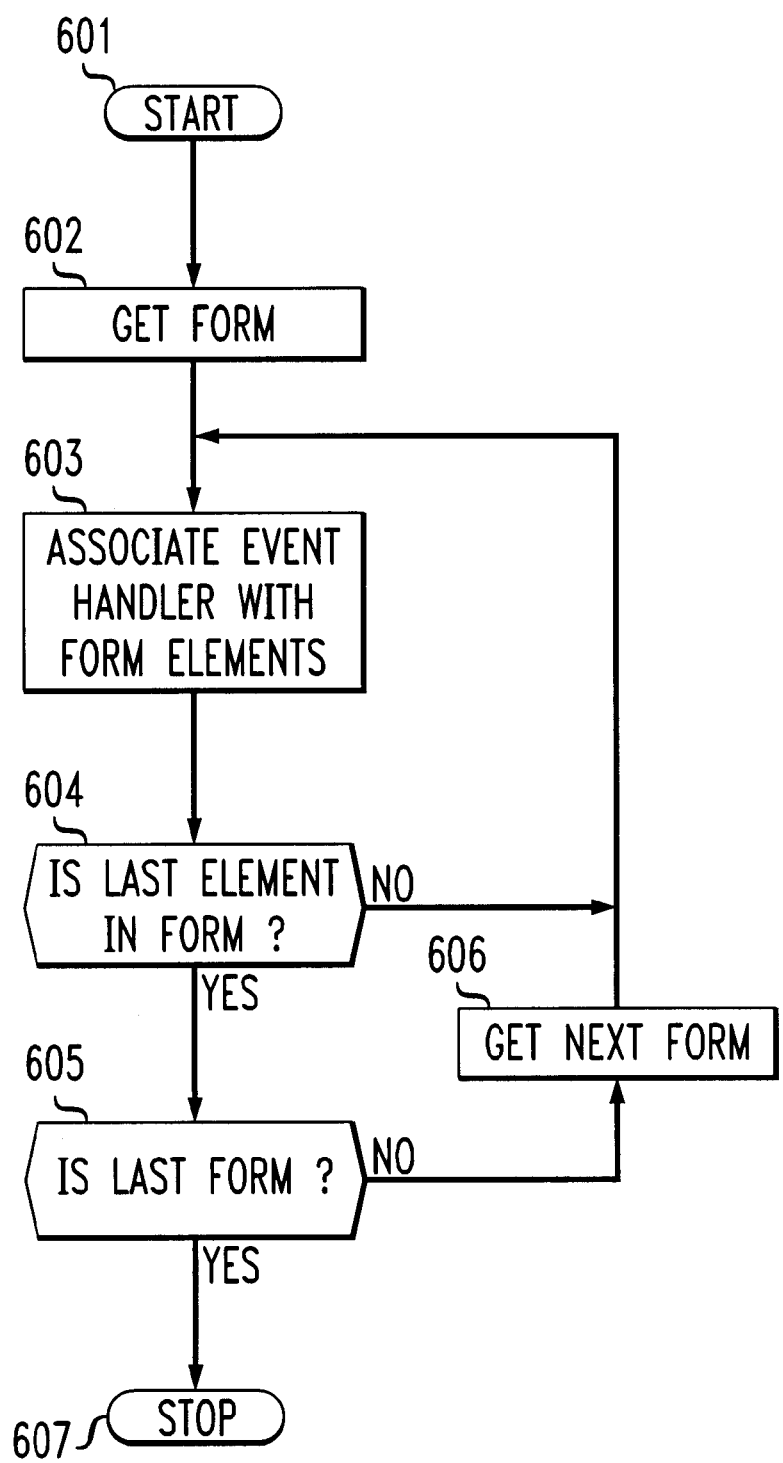
FIG. 6 is a flowchart depicting the steps of applicants' unique process for relating event handlers with form elements employed in the surrogate of FIG. 5.

A process for associating event handlers with form elements is shown in FIG. 6. The process is started in step 601. Thereafter, control is transferred to step 602, which causes a form to be obtained. Then, step 603 associates the event handlers with form elements. Thereafter, step 604 tests to determine if the current form element is the last element in the form. If the test result in step 604 is NO, control is returned to step 603 and steps 603 and 604 are iterated until step 604 yields a YES result and control is transferred to step 605. Step 605 tests to determine if the current form is the last form in the document. If the test result instep 605 is NO, control is transferred to step 606, which causes another form to be obtained. Thereafter, control is transferred to step 603 and steps 603 through 606 are iterated until step 605 yields a YES result and the process is stopped via step 607.

Returning to FIG. 5, step 510 processes the input and generates an output in accordance with prescribed criteria. Specifically, if the input is a user input as indicated in step 305, step 310 processes it to generate a session or browser output. If the input is a session input as indicated in step 307, step 310 processes it to generate a user or browser output. If the input is a browser input as indicated in step 308, step 310 processes it to generate a session output. Upon processing an input and generating an output in step 510, control is transferred to step 511, which tests to determine if there is a user output. If the test result in step 511 is YES, control is transferred to step 512, which sends the user output to a user interface (UI), and control is transferred to steps 502 and 503. If the test result in step 511 is NO, control is transferred to step 513, which tests to determine if there is a browser output. If the test result in step 513 is YES, control is transferred to step 514, which sends the browser output to the browser, and control is transferred to steps 502 and 503. If the test result in step 513 is NO, control is transferred to step 515, which tests to determine if there is a session output. If the test result in step 515 is YES, control is transferred to step 515, which sends the session output to the session, and control is transferred to steps 502 and 503. If the test result in step 515 is NO, control is transferred to steps 502 and 503 and the process is iterated as described above, i.e., steps 502 through 515 are repeated. In this example, as seen from the above description, the surrogate continuously keeps track of the state of the forms in a document by being notified by the browser through the event handlers of changes in the values of the form elements in a document. When notification of a change is received by the other collaborators' surrogates, the users assume that their document is identical to the source document, and update the corresponding data entry in their form.

Figure 7:
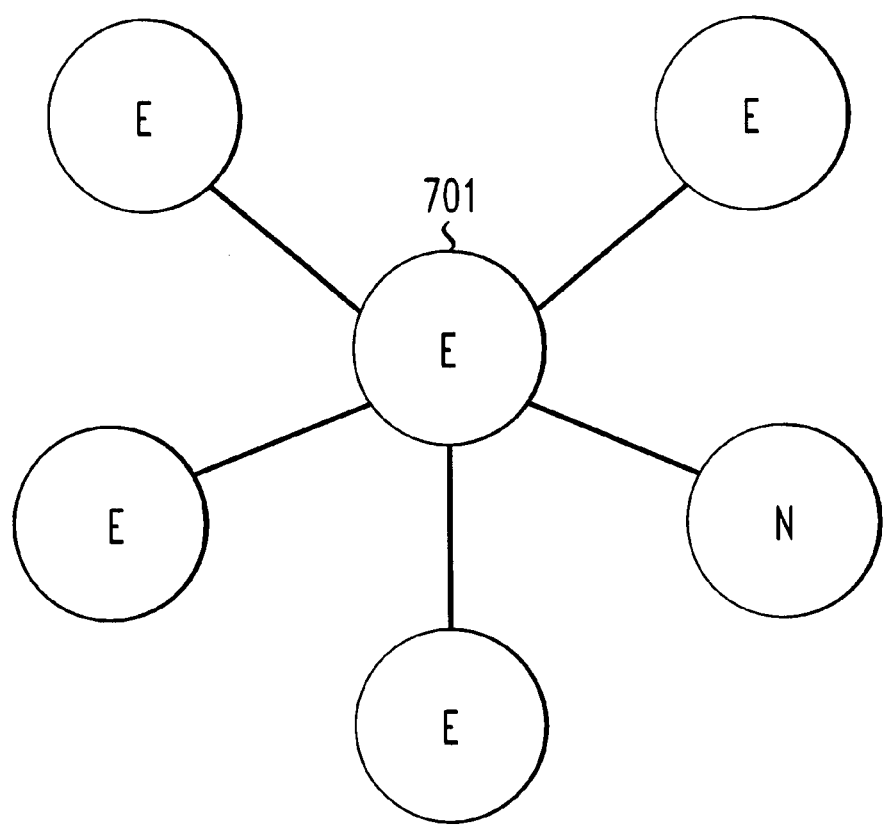
FIG. 7 illustrates a hierarchy of multiple controllers in the system of FIG. 1.

In the course of a session, the collaborators may point and click at a specified icon on their computers using a mouse device to make, for example, text-chat connections for exchanging their opinions on filling out the form elements as the HTML documents unfold before them. However, it will be appreciated that a person skilled in the art may program controller 103 to enforce certain access control. For example, controller 103 may afford different collaborators 103 different capabilities during a collaborative session. Controller 103 may also enforce a priority scheme whereby the collaborators take turns to lead the session and communicate with one another. Other computer users who want to either create a session or join an on-going session go through the similar process to that of U-1 through U-N described above. However, a controller may be overloaded at a certain point as more and more collaborators joining a particular session regulated by the controller. Because of the server-based architecture of server system 100 where intelligence and information on every user's connection resides in manager 104, the system capacity is readily scaleable to accommodate a growing number of the collaborators, without affecting the service quality. Once the number reaches a predetermined threshold at a controller, manager 104 employs a new controller to connect the additional collaborators. The new controller and existing controllers for the same session dynamically reorganize themselves in a hierarchy to facilitate communications with one another and their coordination to carry out the session in a synchronous manner. FIG. 7 illustrates one such hierarchy, where the existing controllers (denoted by circles marked "E") and the new controller (denoted by a circle marked "N") form a star topology. In this hierarchy, controller 701 acts as an information center and efficiently distributes information from any of the controllers to all other controllers.

Furthermore, as more and more controllers are engaged, the initial capacity of server system 100 may run out. Again, because of the inventive architecture of server system 100, a new controller may be engaged using additional hardware, which can be easily absorbed into server system 100.

Similarly, when the number of sessions exceeds a predetermined threshold, multiple managers similar to manager 104 are instituted and the managers are dynamically reorganized in a hierarchy similar to that of FIG. 7.

Figure 8:
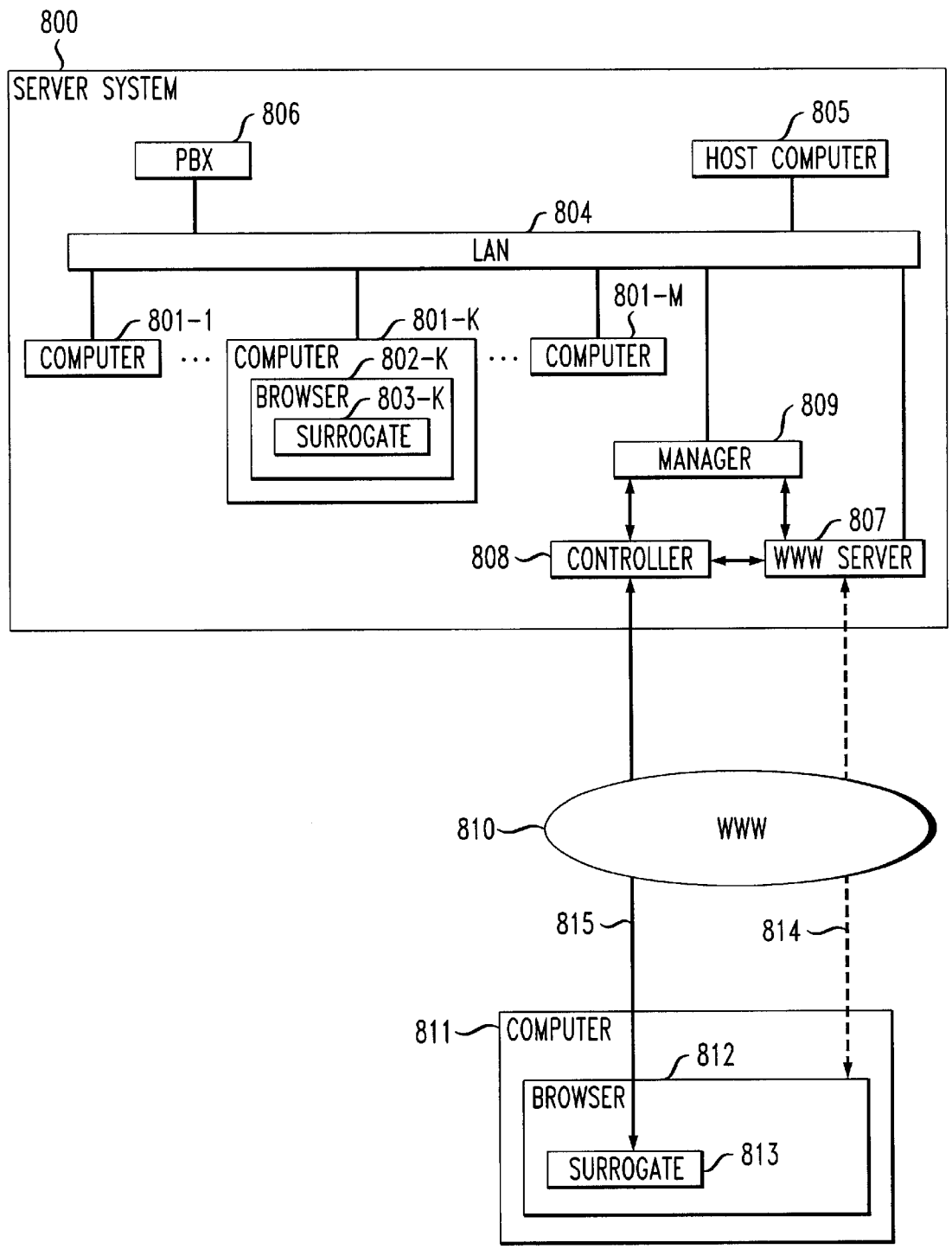
FIG. 8 shows in simplified form details of a call center arrangement including an embodiment of the invention.

FIG. 8 shows, in simplified block diagram form, details of another communications system (call center) including an embodiment of the invention that, typically, would be employed in a company's customer service organization. Specifically shown is server system 800 that includes a plurality of customer service agent stations, i.e., computers 801-1 through 801-M. Each computer when operating includes a browser and surrogate, for example computer 801-K includes browser 802-K and surrogate 803-K. Also shown is local area network (LAN) 804 for interconnecting the components of server system 800. Theses components further include, for example, host computer 805 and private branch exchange (PBX) 806. LAN 804 also interfaces WWW server 807 and manager 809. Controller 808 interfaces directly with WWW server 807 and manager 809. Customers, clients, or others seeking service and/or advice may interface server system 800 via the World Wide Web (WWW) 810 through use of, for example, personal computer 811. Computer 811 also includes browser 812 and surrogate 813. Specifically, Browser 812 establishes a link 814 through WWW 810 to WWW server 807, while surrogate 813 established communications to controller 808 via link 815. Assuming that the customer service agent is employing computer 801-K. Then, operation of the communications between the customer at computer 811 and the customer service agent at computer 801-K is essentially identical to that described above in relationship to FIG. 1 where a customer is employing computer U-N and the customer service agent is employing computer U-1.

What is claimed is:

1. A method for use in a user device including a browser for obtaining information from a communication system, the browser causing a document to be displayed including at least one document element for containing a prescribed data value, the method comprising the steps of:

creating a surrogate in said user device;

said surrogate including the steps of obtaining an indication of a change in said prescribed data value of said at least one document element;

supplying a representation of an indicated change in said prescribed data value of said at least one document element along with at least one name associated with said at least one form element as a browser input;

determining whether said at least one name associated with said at least one form element is available at the surrogate;

in response to said at least one name being available, processing said browser input to generate a prescribed output; and supplying said generated prescribed output as an output to said communication system.

2. The method as defined in claim 1 wherein said communication system includes a World Wide Web (WWW).

3. The method as defined in claim 1 wherein said prescribed output is a representation of a changed data value for said at least one document element.

4. The method as defined in claim 3 wherein said step of processing includes processing said browser input to generate a session output representative of said change in said at least one document element data value.

5. The method as defined in claim 1 wherein individual ones of a plurality of document elements are associated on a one-to-one basis with a corresponding plurality of names.

6. The method as defined in claim 1 wherein said document element includes at least one form having at least one form element for containing a prescribed data value, and the at least one name is a HTML code as follows <FORM>

<INPUT TYPE=TEXT NAME=myXXXX>

<FORM> where XXXX is a form field, i.e., element, and the name XXXX is supplied along with the XXXX form element data value change.

7. The method as defined in claim 1 wherein said document element includes at least one form having at least one form element for containing a prescribed data value, and said step of obtaining includes utilizing at least one event handler to indicate said change in said prescribed data value of said at least one form element.

8. The method as defined in claim 7 wherein a plurality of event handlers are associated on a one-to-one basis with a corresponding plurality of form elements in the document.

9. The method as defined in claim 7 wherein the at least one event handler is a HTML/JavaScript code as follows <FORM>

<INPUT TYPE=TEXT ONCHANGE= "XXXXChangeHandler( )">

<FORM> where XXXX is a form field, i.e., element, and the JavaScript function "ChangeHandler" is invoked every time the XXXX form element data value changes.

10. The method as defined in claim 7 wherein said at least one event handler is inserted in said document using JavaScript code in said surrogate as follows document.forms[w].elements[y].onChange= changeHandler, where "w" is a form number and "y" is an element number in a form, to specify that the JavaScript function "XXXXChangeHandler( )" be invoked every time the data value of the "XXXX" field, i.e., element, of the form changes.

11. The method as defined in claim 1 wherein said step of obtaining includes polling said browser to detect any change in said prescribed data value of said at least one document element.

12. The method as defined in claim 11 wherein said document element includes at least one form having at least one form element for containing a prescribed data value, and said step of polling includes (a) storing an initial data value of said at least one form element, (b) determining whether said data value of said at least one form element has changed from its initial data value, if the result in step (b) is YES, (c) generating a form element change event for said data value of said at least one form element, and (d) supplying said form element data value change event as said browser input.

13. The method as defined in claim 12 wherein said step of polling further includes, if the result in step (b) is NO, (e) determining if the at least one form element is the last element in the at least one form, if the result of step (e) is NO, (f) going to a next form element in said at least one form and repeating appropriate ones of steps (b) through (f).

14. The method as defined in claim 13 wherein said step of polling further includes (g) determining whether said change in said data value of said at least one form element is the last change in a data value of a form element in said at least one form, if the result in step (g) is NO, repeating appropriate ones of steps (b) through (g).

15. The method as defined in claim 14 wherein, if the result in step (e) is YES, (h) determining if said at least on form is the last form of the document, if the result of step (h) is NO, (i) going to a next form in the document and repeating appropriate ones of steps (b) through (i).

16. The method as defined in claim 15 wherein, if the result in step (h) is YES, (j) terminating the polling step.

17. The method as defined in claim 15 wherein, if the result in step (g) is YES, repeating appropriate ones of steps (b) through (i).

18. The method as defined in claim 17 wherein, if the result in step (h) is YES, (j) terminating the polling step.

19. A method for use in a server system that provides communication in synchrony among user devices in a session via a communication system, at least a first user device and an at least second user device being in said session, each user device including a browser for obtaining information from said server system, each browser causing a document to be displayed at each user device including at least one document element for containing a prescribed data value, the method comprising the steps of:

creating a surrogate in each of said user devices;

said surrogate including the steps of obtaining an indication of a change in said prescribed data value of said at least one document element;

supplying a representation of an indicated change in said prescribed data value of said at least one document element along with at least one name associated with said at least one document element as a browser input;

determining whether said at least one name associated with said at least one document element is available at the surrogate;

in response to said at least one name being available, processing said browser input to generate a prescribed output; and supplying said generated prescribed output as an output to said communication system to be supplied to at least one other of said surrogates in at least one other of said user devices, whereby a plurality of users can collaboratively make changes in said at least one document element data value if said name associated with said at least one document element is available to a surrogate in the user device so that asymmetric collaboration is realized.

20. The method as defined in claim 19 wherein said communication system includes a World Wide Web (WWW).

21. The method as defined in claim 19 wherein said prescribed output is a representation of a changed data value for said at least one document element.

22. The method as defined in claim 21 wherein said step of processing includes processing said browser input to generate a session output representative of said change in said at least one document element data value.

23. The method as defined in claim 19 wherein individual ones of a plurality of document elements are associated on a one-to-one basis with a corresponding plurality of names.

24. The method as defined in claim 19 wherein said document element includes at least one form having at least one form element for containing a prescribed data value, and the at least one name is a HTML code as follows <FORM>

<INPUT TYPE=TEXT NAME=myXXXX>

<FORM> where XXXX is a form field, i.e., element, and the name XXXX is supplied along with the XXXX form element data value change.

25. The method as defined in claim 19 wherein said document element includes at least one form having at least one form element for containing a prescribed data value, and said step of obtaining includes utilizing at least one event handler to indicate said change in said prescribed data value of said at least one form element.

26. The method as defined in claim 25 wherein a plurality of event handlers are associated on a one-to-one basis with a corresponding plurality of form elements in the document.

27. The method as defined in claim 25 wherein the at least one event handler is a HTML/JavaScript code as follows <FORM>

<INPUT TYPE=TEXT ONCHANGE= "XXXXChangeHandler( )">

<FORM> where XXXX is a form field, i.e., element, and the JavaScript function "XXXXChangeHandler" is invoked every time the XXXX form element data value changes.

28. The method as defined in claim 25 wherein said at least one event handler is inserted in said document using JavaScript code in said surrogate as follows document.forms[w].elements[y].onChange= changeHandler, where "w" is a form number and "y" is an element number in a form, to specify that the JavaScript function "XXXXChangeHandler( )" be invoked every time the data value of the "XXXX" field, i.e., element, of the form changes.

29. The method as defined in claim 19 wherein said step of obtaining includes polling said browser to detect any change in said prescribed data value of said at least one document element.

30. The method as defined in claim 29 wherein said document element includes at least one form having at least one form element for containing a prescribed data value, and said step of polling includes (a) storing an initial data value of said at least one form element, (b) determining whether said data value of said at least one form element has changed from its initial data value, if the result in step (b) is YES, (c) generating a form element change event for said data value of said at least one form element, and (d) supplying said form element data value change event as said browser input.

31. The method as defined in claim 30 wherein said step of polling further includes, if the result in step (b) is NO, (e) determining if the at least one form element is the last element in the at least one form, if the result of step (e) is NO, (f) going to a next form element in said at least one form and repeating appropriate ones of steps (b) through (f).

32. The method as defined in claim 31 wherein said step of polling further includes (g) determining whether said change in said data value of said at least one form element is the last change in a data value of a form element in said at least one form, if the result in step (g) is NO, repeating appropriate ones of steps (b) through (g).

33. The method as defined in claim 32 wherein, if the result in step (e) is YES, (h) determining if said at least on form is the last form of the document, if the result of step (h) is NO, (i) going to a next form in the document and repeating appropriate ones of steps (b) through (i).

34. The method as defined in claim 33 wherein, if the result in step (h) is YES, (j) terminating the polling step.

35. The method as defined in claim 33 wherein, if the result in step (g) is YES, repeating appropriate ones of steps (b) through (i).

36. The method as defined in claim 35 wherein, if the result in step (h) is YES, (j) terminating the polling step.

37. Apparatus for use in a user device including a browser for obtaining information from a communication system, the browser causing a document to be displayed including at least one document element for containing a prescribed data value, the user device comprising:

a first processor responsive to supplied programming code for creating a surrogate in said user device;

said surrogate including a change detector for obtaining an indication of a change in said prescribed data value of said at least one document element;

a first supplier for supplying a representation of an indicated change in said prescribed data value of said at least one document element along with at least one name associated with said at least one document element as a browser input;

a tester for determining whether said at least one name associated with said at least one document element is available at the surrogate;

a second supplier responsive to said name associated with said at least one document element being available for supplying said browser input to a generator;

said generator being responsive to said browser input for generating a prescribed output; and an outputter for supplying as an output to said communication system said generated prescribed output.

38. The apparatus as defined in claim 37 wherein said communication system includes a World Wide Web (WWW).

39. The apparatus as defined in claim 37 wherein said prescribed output is a representation of a changed data value for said at least one document element.

40. The apparatus as defined in claim 39 wherein said generator includes a second processor for processing said browser input to generate a session output representative of said change in said at least one document element data value.

41. The apparatus as defined in claim 37 wherein individual ones of a plurality of documents elements are associated on a one-to-one basis with a corresponding plurality of names.

42. The apparatus as defined in claim 37 wherein said document element includes at least one form having at least one form element for containing a prescribed data value, and the at least one name is a HTML code as follows <FORM>
<INPUT TYPE=TEXT NAME=myXXXX>
<FORM> where XXXX is a form field, i.e., element, and the name XXXX is supplied along with the XXXX form element data value change.

43. The apparatus as defined in claim 37 wherein said change detector utilizes at least one event handler to indicate said change in said prescribed data value of said at least one document element.

44. The apparatus as defined in claim 43 wherein a plurality of event handlers are associated on a one-to-one basis with a corresponding plurality of said document elements.

45. The apparatus as defined in claim 43 wherein said document element includes at least one form having at least one form element for containing a prescribed data value, and the at least one event handler is a HTML/JavaScript code as follows <FORM>
<INPUT   TYPE=TEXT   ONCHANGE= "XXXXChangeHandler( )">
<FORM> where XXXX is a form field, i.e., element, and the JavaScript function "XXXXChangeHandler" is invoked every time the XXXX form element data value changes.

46. The apparatus as defined in claim 43 wherein said document element includes at least one form having at least one form element for containing a prescribed data value, and said at least one event handler is inserted in said document using JavaScript code in said surrogate as follows document.forms[w].elements[y].onChange= changeHandler, where "w" is a form number and "y" is an element number in a form, to specify that the JavaScript function "XXXXChangeHandler( )" be invoked every time the data value of the "XXXX" field, i.e., element, of the form changes.

47. The apparatus as defined in claim 37 wherein said change detector includes a poller for polling said browser to detect any change in said prescribed data value of said at least one document element.

48. The apparatus as defined in claim 47 wherein said document element includes at least one form having at least one form element for containing a prescribed data value, and said poller includes a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input.

49. The apparatus as defined in claim 48 wherein said poller further includes, a second tester, responsive to a NO result from said first tester, for determining if the at least one form element is the last element in the at least one form, a first router, responsive to a NO result from said second tester, for going to a next form element in said at least one form.

50. The apparatus as defined in claim 49 wherein said poller further includes a third tester for determining whether said change in said data value of said at least one form element is the last change in a data value of a form element in said at least one form, a second router, responsive to a NO result from said third tester, for going to a next form element in said at least one form.

51. The apparatus as defined in claim 50 wherein said poller further includes a fourth tester, responsive to a YES result from said third tester, for determining if said at least one form is the last form of the document, a third router, responsive to a NO result from said fourth router, for going to the next form in the document.

52. Apparatus for use in a server system that provides communication in synchrony among user devices in a session via a communication system, at least a first user device and an at least second user device being in said session, each user device including a browser for obtaining information from said server system, each browser causing a document to be displayed at each user device including at least one document element for containing a prescribed data value, each of the user devices comprising:

a first processor responsive to supplied programming code for creating a surrogate in said user device;

said surrogate including a change detector for obtaining an indication of a change in said prescribed data value of said at least one document element;

a first supplier for supplying a representation of an indicated change in said prescribed data value of said at least one document element along with at least one name associated with said at least one document element as a browser input;

a tester for determining whether said at least one name associated with said at least one document element is available at the surrogate;

a second supplier responsive to said name associated with said at least one document element being available for supplying said browser input to a generator; said generator being responsive to said browser input for generating a prescribed output; and an outputter for supplying as an output to said communication system said generated prescribed output to be supplied to at least one other of said surrogates in at least one other of said user devices, whereby a plurality of users can collaboratively make changes in said at least one document element data value if said name associated with said at least one document element is available to a surrogate in the user device so that asymmetric collaboration is realized.

53. The apparatus as defined in claim 52 wherein said communication system includes a World Wide Web (WWW).

54. The apparatus as defined in claim 52 wherein said prescribed output is a representation of a changed data value for said at least one document element.

55. The apparatus as defined in claim 54 wherein said generator includes a second processor for processing said browser input to generate a session output representative of said change in said at least one document element data value.

56. The apparatus as defined in claim 52 wherein individual ones of a plurality of document elements are associated on a one-to-one basis with a corresponding plurality of names.

57. The apparatus as defined in claim 52 wherein said document element includes at least one form having at least one form element for containing a prescribed data value, and the at least one name is a HTML code as follows <FORM>
<INPUT TYPE=TEXT NAME=myXXXX>
<FORM> where XXXX is a form field, i.e., element, and the name XXXX is supplied along with the XXXX form element data value change.

58. The apparatus as defined in claim 52 wherein said change detector utilizes at least one event handler to indicate said change in said prescribed data value of said at least one document element.

59. The apparatus as defined in claim 58 wherein said document element includes at least one form having at least one form element for containing a prescribed data value, and the at least one event handler is a HTML/JavaScript code as follows <FORM>
<INPUT TYPE=TEXT ONCHANGE="XXXXChangeHandler( )">
<FORM> where XXXX is a form field, i.e., element, and the JavaScript function "XXXXChangeHandler" is invoked every time the XXXX form element data value changes.

60. The apparatus as defined in claim 58 wherein said document element includes at least one form having at least one form element for containing a prescribed data value, and said at least one event handler is inserted in said document using JavaScript code in said surrogate as follows document.forms[w].elements[y].onChange=changeHandler, where "w" is a form number and "y" is an element number in a form, to specify that the JavaScript function "XXXXChangeHandler( )" be invoked every time the data value of the "XXXX" field, i.e., element, of the form changes.

61. The apparatus as defined in claim 52 wherein said change detector includes a poller for polling said browser to detect any change in said prescribed data value of said at least one document element.

62. The apparatus as defined in claim 61 wherein said document element includes at least one form having at least one form element for containing a prescribed data value, and said poller includes a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input.

63. The apparatus as defined in claim 62 wherein said poller further includes, a second tester, responsive to a NO result from said first tester, for determining if the at least one form element is the last element in the at least one form, a first router, responsive to a NO result from said second tester, for going to a next form element in said at least one form.

64. The apparatus as defined in claim 63 wherein said poller further includes a third tester for determining whether said change in said data value of said at least one form element is the last change in a data value of a form element in said at least one form, a second router, responsive to a NO result from said third tester, for going to a next form element in said at least one form.

65. The apparatus as defined in claim 64 wherein said poller further includes a fourth tester, responsive to a YES result from said third tester, for determining if said at least one form is the last form of the document, a third router, responsive to a NO result from said fourth router, for going to the next form in the document.

66. Apparatus for use in a user device including a browser for obtaining information from a communication system, the browser causing a document to be displayed including at least one document element for containing a prescribed data value, the user device comprising:

means responsive to supplied programming code for creating a surrogate in said user device;

said surrogate including means for obtaining an indication of a change in said prescribed data value of said at least one document element;

first means for supplying a representation of an indicated change in said prescribed data value of said at least one document element along with at least one name associated with said at least one document element as a browser input;

means for determining whether said at least one name associated with said at least one document element is available at the surrogate;

second means responsive to said name associated with said at least one document element being available for supplying said browser input to a means for generating;

means responsive to said browser input for generating a prescribed output; and means for supplying as an output to said communication system said generated prescribed output.

67. The invention as defined in claim 66 wherein said communication system includes a World Wide Web (WWW).

68. The invention as defined in claim 66 wherein said prescribed output is a representation of a changed data value for said at least one document element.

69. The invention as defined in claim 66 wherein said means for generating includes means for processing said browser input to generate a session output representative of said change in said at least one document element data value.

70. The invention as defined in claim 66 wherein individual ones of a plurality of document elements are associated on a one-to-one basis with a corresponding plurality of names.

71. The invention as defined in claim 66 wherein said document element includes at least one form having at least one form element for containing a prescribed data value, and the at least one name is a HTML code as follows <FORM>
<INPUT TYPE=TEXT NAME=myXXXX>
<FORM> where XXXX is a form field, i.e., element, and the name XXXX is supplied along with the XXXX form element data value change.

72. The invention as defined in claim 66 wherein said means for obtaining includes means for utilizing at least one event handler to indicate said change in said prescribed data value of said at least one document element.

73. The invention as defined in claim 72 wherein a plurality of event handlers are associated on a one-to-one basis with a corresponding plurality of said document elements.

74. The invention as defined in claim 72 wherein said document element includes at least one form having at least one form element for containing a prescribed data value, and the at least one event handler is a HTML/JavaScript code as follows <FORM>
<INPUT TYPE=TEXT ONCHANGE="XXXXChangeHandler( )">
<FORM> where XXXX is a form field, i.e., element, and the JavaScript function "XXXXChangeHandler" is invoked every time the XXXX form element data value changes.

75. The invention as defined in claim 72 wherein said document element includes at least one form having at least one form element for containing a prescribed data value, and said at least one event handler is inserted in said document using JavaScript code in said surrogate as follows document.forms[w].elements[y].onChange=changeHandler, where "w" is a form number and "y" is an element number in a form, to specify that the JavaScript function "XXXXChangeHandler( )" be invoked every time the data value of the "XXXX" field, i.e., element, of the form changes.

76. The invention as defined in claim 66 wherein said means for obtaining includes means for polling said browser to detect any change in said prescribed data value of said at least one document element.

77. The invention as defined in claim 76 wherein said document element includes at least one form having at least one form element for containing a prescribed data value, and said prescribed output is a representation of a changed data value for said at least one form element.

78. The invention as defined in claim 77 wherein said means for polling includes means for storing an initial data value of said at least one form element, first means for determining whether said data value of said at least one form element has changed from its initial data value, means, responsive to a YES result from said first means, for generating a form element change event for said data value of said at least one form element, and means for supplying said form element data value change event as said browser input.

79. The invention as defined in claim 78 wherein said means for polling further includes, second means, responsive to a NO result from said first means, for determining if the at least one form element is the last element in the at least one form, first router means, responsive to a NO result from said second means, for going to a next form element in said at least one form.

80. The invention as defined in claim 79 wherein said means for polling further includes third means for determining whether said change in said data value of said at least one form element is the last change in a data value of a form element in said at least one form, second router means, responsive to a NO result from said third means, for going to a next form element in said at least one form.

81. The invention as defined in claim 80 wherein said means for polling further includes a fourth means, responsive to a YES result from said third means, for determining if said at least one form is the last form of the document, third router means, responsive to a NO result from said fourth means, for going to a next form in the document.

82. A server system that provides communication in synchrony among user devices in a session via a communication system, comprising:
a first user device;
an at least second user device, said first user device and said at least second user device being used in said session and each user device including a browser for obtaining information from said server system, each browser causing a document to be displayed at each user device including at least one document element for containing a prescribed data value;
each of said user devices further including
a first processor responsive to supplied programming code for creating a surrogate in said user device;
said surrogate including
a change detector for obtaining an indication of a change in said prescribed data value of said at least one document element;
a first supplier for supplying a representation of an indicated change in said prescribed data value of said at least one document element along with at least one name associated with said at least one document element as a browser input;
a tester for determining whether said at least one name associated with said at least one document element is available at the surrogate;
a second supplier responsive to said name associated with said at least one document element being available for supplying said browser input to a generator;
said generator being responsive to said browser input for generating a prescribed output; and
an outputter for supplying as an output to said communication system said generated prescribed output to be supplied to others of said surrogates in others of said user devices,
whereby a plurality of users can collaboratively make changes in said at least one document element data value if said name associated with said at least one document element is available to a surrogate in the user device so that asymmetric collaboration is realized.

83. The invention as defined in claim 82 wherein said communication system includes a World Wide Web (WWW).

84. The invention as defined in claim 82 wherein said prescribed output is a representation of a changed data value for said at least one document element.

85. The invention as defined in claim 84 wherein said generator includes a second processor for processing said browser input to generate a session output representative of said change in said at least one document element data value.

86. The invention as defined in claim 82 wherein individual ones of a plurality of document elements are associated on a one-to-one basis with a corresponding plurality of names.

87. The invention as defined in claim 82 wherein said document element includes at least one form having at least one form element for containing a prescribed data value, and the at least one name is a HTML code as follows <FORM>
<INPUT TYPE=TEXT NAME=myXXXX>
<FORM>
where XXXX is a form field, i.e., element, and the name XXXX is supplied along with the XXXX form element data value change.

88. The invention as defined in claim 82 wherein said change detector utilizes at least one event handler to indicate said change in said prescribed data value of said at least one document element.

89. The invention as defined in claim 88 wherein said document element includes at least one form having at least one form element for containing a prescribed data value, and the at least one event handler is a HTML/JavaScript code as follows
<FORM>
<INPUT TYPE=TEXT ONCHANGE= "XXXXChangeHandler( )">
<FORM>
where XXXX is a form field, i.e., element, and the JavaScript function "XXXXChangeHandler" is invoked every time the XXXX form element data value changes.

90. The invention as defined in claim 88 wherein said document element includes at least one form having at least one form element for containing a prescribed data value, and said at least one event handler is inserted in said document using JavaScript code in said surrogate as follows
document.forms[w].elements[y].onChange= changeHandler,
where "w" is a form number and "y" is an element number in a form,
to specify that the JavaScript function "XXXXChangeHandler( )" be invoked every time the data value of the "XXXX" field, i.e., element, of the form changes.

91. The invention as defined in claim 82 wherein said change detector includes a poller for polling said browser to detect any change in said prescribed data value of said at least one document element.

92. The invention as defined in claim 91 wherein said document element includes at least one form having at least one form element for containing a prescribed data value, and said poller includes a storage unit for storing an initial data value of said at least one form element, a first tester for determining whether said data value of said at least one form element has changed from its initial data value, a second processor, responsive to a YES result from said first tester, for generating a form element change event for said data value of said at least one form element, and a second supplier for supplying said form element data value change event as said browser input.

93. The invention as defined in claim 92 wherein said poller further includes, a second tester, responsive to a NO result from said first tester, for determining if the at least one form element is the last element in the at least one form, a first router, responsive to a NO result from said second tester, for going to a next form element in said at least one form.

94. The invention as defined in claim 93 wherein said poller further includes a third tester for determining whether said change in said data value of said at least one form element is the last change in a data value of a form element in said at least one form, a second router, responsive to a NO result from said third tester, for going to a next form element in said at least one form.

* * * * *